(12) United States Patent
DeStefano et al.

(10) Patent No.: US 9,644,365 B1
(45) Date of Patent: *May 9, 2017

(54) JACKABLE BUILDING FOUNDATION SYSTEM

(71) Applicants: Philip DeStefano, Verona, NJ (US); John A. Bianco, Verona, NJ (US)

(72) Inventors: Philip DeStefano, Verona, NJ (US); John A. Bianco, Verona, NJ (US)

(73) Assignee: High Tide Homes Inc., Fairfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,952

(22) Filed: Nov. 9, 2016

Related U.S. Application Data

(63) Continuation-in-part of application No. 15/097,709, filed on Apr. 13, 2016.

(51) Int. Cl.

| | | |
|---|---|---|
| *E02B 17/08* | (2006.01) | |
| *E04B 1/343* | (2006.01) | |
| *E04H 9/14* | (2006.01) | |
| *E04B 1/24* | (2006.01) | |
| *E04G 23/06* | (2006.01) | |
| *E02D 27/32* | (2006.01) | |

(52) U.S. Cl.
CPC .......... *E04B 1/34336* (2013.01); *E02D 27/32* (2013.01); *E04B 1/24* (2013.01); *E04G 23/065* (2013.01); *E04H 9/145* (2013.01); *E02D 2200/11* (2013.01); *E02D 2600/10* (2013.01)

(58) Field of Classification Search
CPC ..... E04H 9/145; E02B 17/0809; E02D 27/32; B63B 2035/4426
USPC .... 405/195.1, 196, 198, 203, 218, 219, 221, 405/229, 230, 231, 232; 114/44, 45, 48, 114/264, 265; 51/1, 64, 169.1, 169.2, 51/169.9, 292
See application file for complete search history.

(56) References Cited

U.S. PATENT DOCUMENTS

| | | | | |
|---|---|---|---|---|
| 4,375,931 | A * | 3/1983 | Erdt ..................... | B25H 1/0064 408/129 |
| 4,427,127 | A * | 1/1984 | Kalkowski ............. | B65D 88/50 220/218 |
| 5,140,923 | A * | 8/1992 | Wood ....................... | B63C 3/06 114/48 |
| 5,509,562 | A * | 4/1996 | Jolly ..................... | B65D 88/34 220/216 |

(Continued)

*Primary Examiner* — Benjamin Fiorello
*Assistant Examiner* — Edwin Toldeo-Duran
(74) *Attorney, Agent, or Firm* — Thomas J. Germinario

(57) ABSTRACT

A jackable building foundation system includes a steel beam support frame platform to which one or more platform jacks are attached. Vertical movement of the platform in response to jacking is constrained by cuboidal column guides at the four corners. Each of the column guides comprises two tiers of square roller frames, within each of which is an I-beam engaged between the flanges on either side by two rollers supported on horizontal axes. The orientations of the I-beams and rollers alternate orthogonally at each corner of the platform, so that torques generated by uneven jacking are suppressed and do not result in jamming of the platform as it rises. The system is remotely controlled and monitored by a digital device, such as a smartphone, using application software.

24 Claims, 9 Drawing Sheets

(56) References Cited

U.S. PATENT DOCUMENTS

| | | | |
|---|---|---|---|
| 6,695,542 B2 * | 2/2004 | Stromberg | E21B 19/24 |
| | | | 166/341 |
| 7,921,604 B2 * | 4/2011 | Lino | E04H 9/14 |
| | | | 114/264 |
| 9,249,594 B2 * | 2/2016 | DeStefano | E02D 27/32 |

* cited by examiner

JACKABLE BUILDING FOUNDATION SYSTEM

REFERENCE TO RELATED APPLICATION

This application is a continuation-in-part of U.S. Utility patent application Ser. No. 15/097,709 filed on Apr. 13, 2016, which is incorporated herein by reference.

FIELD OF INVENTION

The present invention relates to the field of building foundations, and more particularly to elevated and jackable building foundations, the movement of which is constrained by guide columns.

BACKGROUND OF THE INVENTION

Buildings located in areas subject to the risk of damage and destruction from floodwaters associated with storm surges or rising water must either be elevated in place or removed from the floodplain in order to reduce flooding damage to them. Construction of foundations for buildings above the flood hazard elevation is often not practical from a technical and/or economic standpoint. Even where foundation construction above historic flood levels is feasible, the trend toward increasingly powerful storm surges and rising water in recent years poses a risk to any building in proximity to a body of water.

One potential approach to minimize the risks associated with storm surges and rising water is to design a jackable foundation that can be raised and lowered with the flood water level. While designs for jackable building structures are known, the problem of maintaining a level platform under conditions of variable and/or unevenly-distributed lifting force has heretofore not been satisfactorily solved.

SUMMARY OF THE INVENTION

The present invention comprises a steel beam support frame platform to which one or more platform jacks are attached. The platform jacks can be hydraulic jacks or electrically driven machine screw actuators, such as those of the Enerpac® M-Series. Vertical movement of the platform in response to jacking is constrained by cuboidal column guides at the four corners. Each of the column guides comprises two tiers of square roller frames, within each of which is an I-beam engaged between the flanges on either side by two rollers supported on horizontal axes. The orientations of the I-beams and rollers alternate orthogonally at each corner of the platform, so that torques generated by uneven jacking are suppressed and do not result in jamming of the platform as it rises.

The jackable building foundation additionally comprises a processing means, which can be microprocessor or CPU, which receives remote instructions to raise and lower the platform through one or more wireless communication and/or routing components, which can include without limitation, a wireless telephone module, a wi-fi module, an rf receiver, a Bluetooth connection, and/or an infrared sensor.

In conjunction with the processing means, the system also comprises an application software ("app"), which runs on a remote digital device, such as a smart phone, a tablet computer or a laptop/desktop personal computer. The app allows a remote user to issue commands which raise and lower the platform. The app also allows a remote user to monitor the raising/lowering progress of the platform and the levelness of the platform in real time. A remote user can also use the app to monitor system status, including the status of external power, backup battery and/or backup generator. The app also enables streaming to a remote user of real time video from cameras interior and exterior to the platform.

The present invention further comprises a backup power supply, comprising one or more high capacity backup batteries, such as lithium ion batteries, and/or a backup generator, to power the system when external power is interrupted. Underground utility connections for the building, such as electric, water, natural gas, and sewer, are located in a crawl space beneath the platform and are extendable to accommodate the raising of the building platform. Such extendible connections comprise coiled and looped service lines for electric, water and natural gas and bellows-type sewer pipes. Overhead utility connections, such as electric, telephone, cable television and internet, are provided with stretchable connections from the utility pole to accommodate raising of the building platform.

To alleviate hydrostatic pressure, multiple standard flood vents are provided in the foundation walls, thereby allowing flood waters to flow in and out of the crawlspace beneath the platform. To prevent accumulation of floating debris in the crawlspace, a nylon mesh netting is attached to the bottom of the platform and unfolds as the platform is raised, thereby providing a perimeter screen around the crawlspace.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
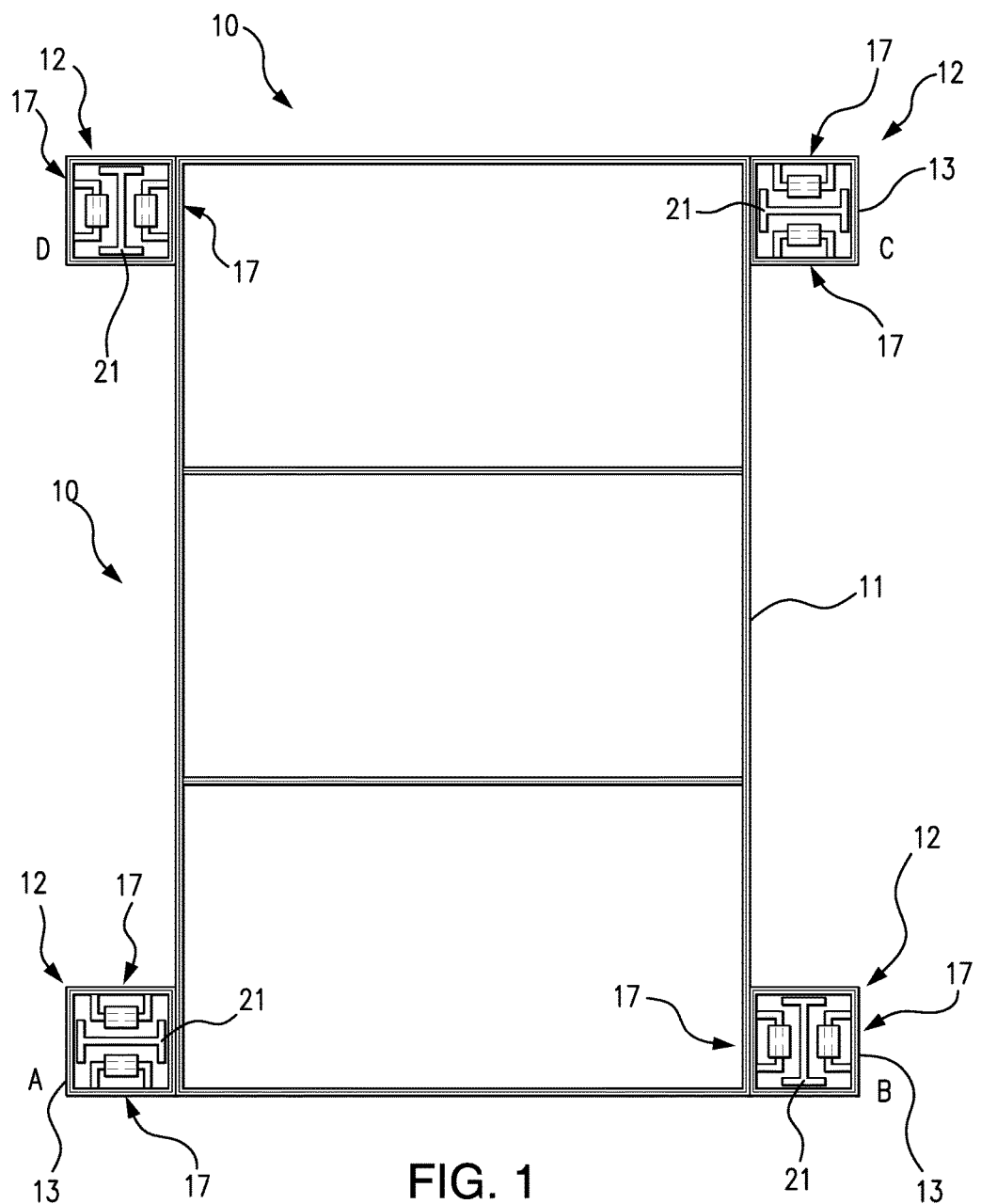
FIG. 1 is a plan view of a jackable house foundation support according to the preferred embodiment of the present invention.
Figure 2:
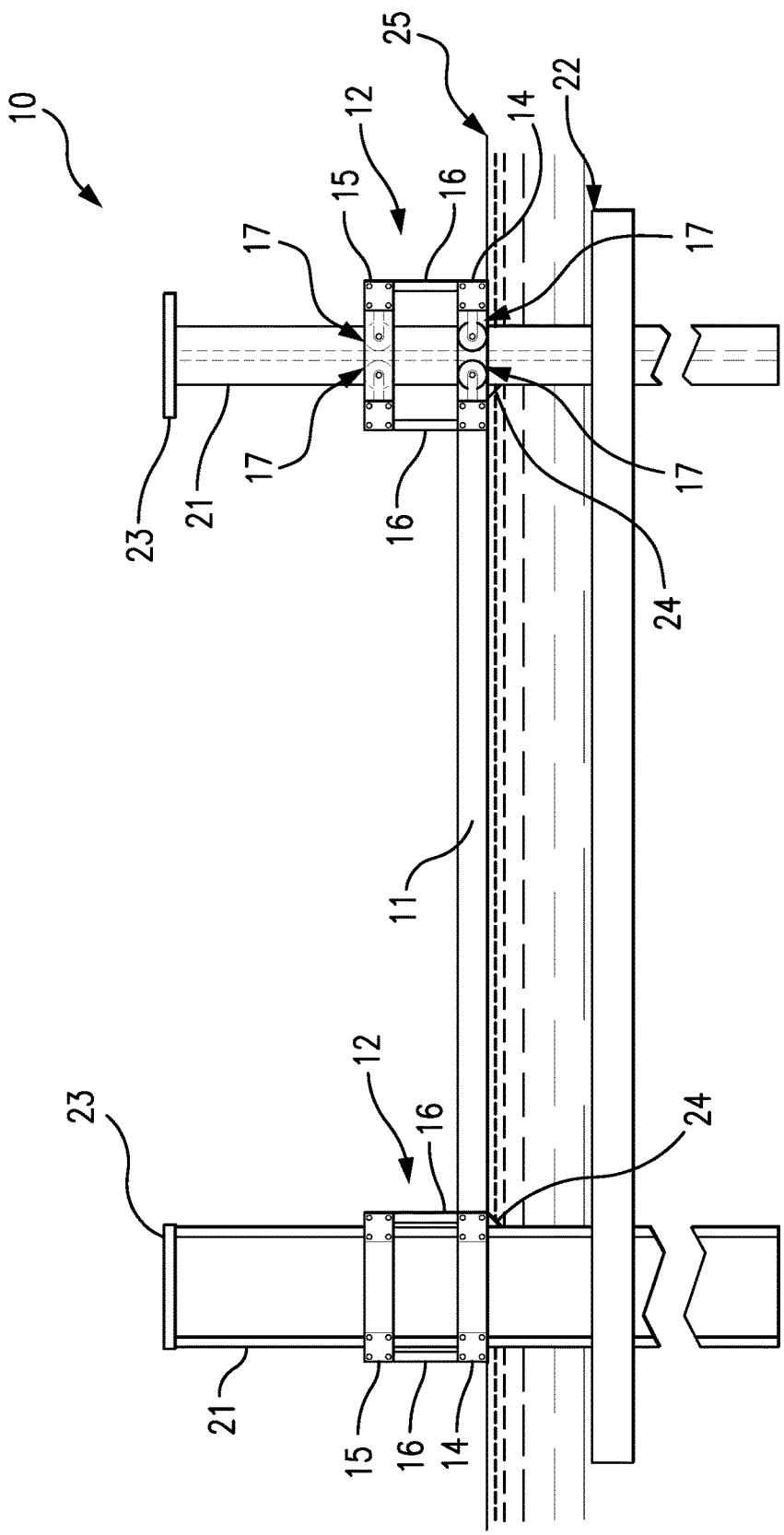
FIG. 2 is a side profile view of a jackable house foundation support according to the preferred embodiment of the present invention.

Referring to FIGS. 1 and 2, a jackable building foundation according to the preferred embodiment of the present invention 10 comprises a rectangular steel foundation support platform 11 with four cuboidal column guides 12, one at each corner. Each of the cuboidal column guides 12 comprises two interconnected square roller frames 13: a first tier roller frame 14 at the level of the foundation support platform 11, and a second tier roller frame 15 several feet above the level of the foundation support platform 11. The first and second tier roller frames 13 are rigidly interconnected at the corners by vertical members 16, so as to form an open cuboidal structure 12.

Figure 5:
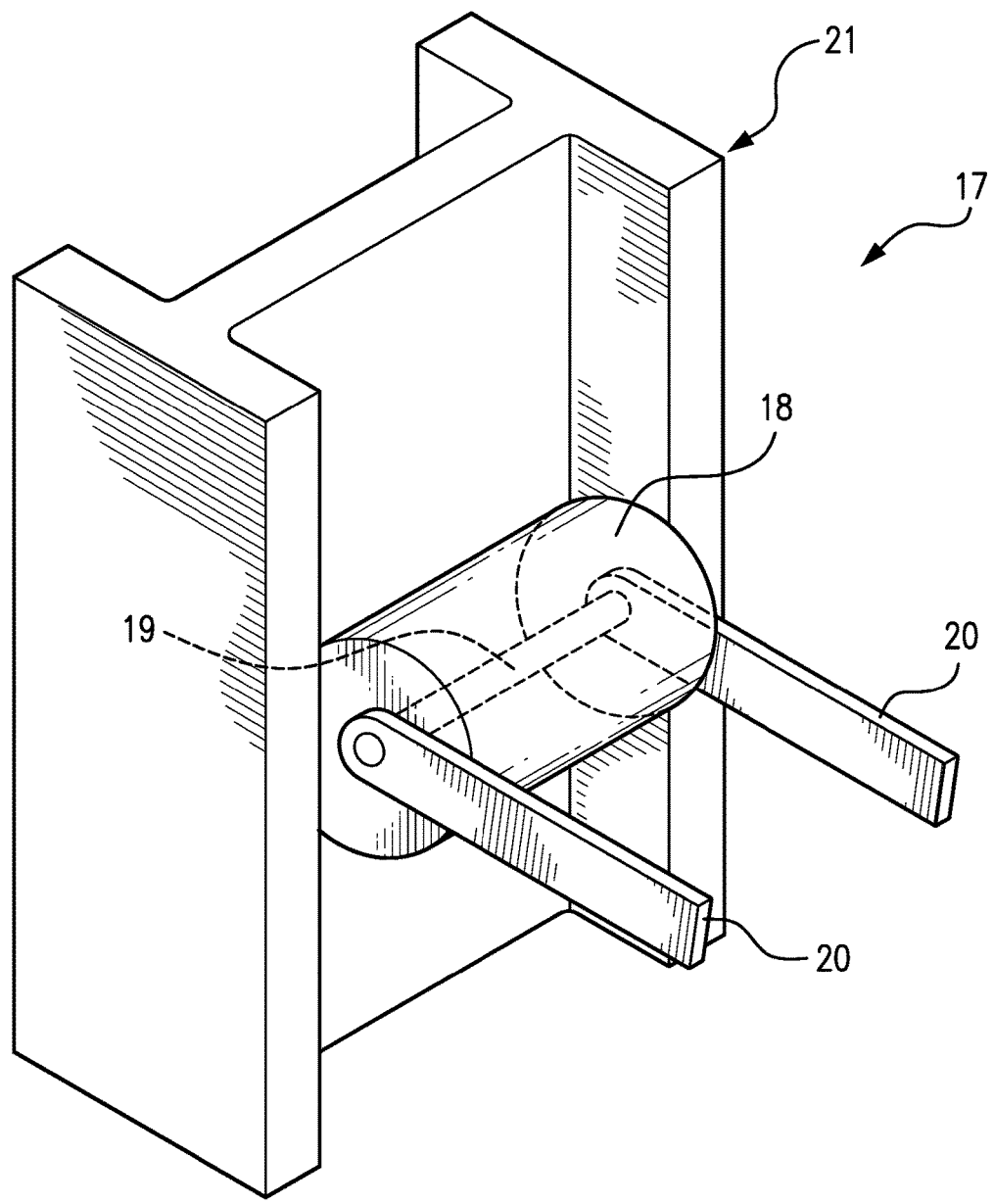
FIG. 5 is a perspective detail view of a roller mechanism according to the preferred embodiment of the present invention.

As best shown in FIG. 1 and in the detail view of FIG. 5, each roller frame 13 contains within it two roller mechanisms 17 on opposing sides on the roller frame 13. Each roller mechanism 17 comprises a cylindrical roller 18 having an axial bore 19, through which it is horizontally rotatably supported by a roller rod 20 attached to the roller frame 13. The opposing rollers 18 of each roller frame 13 slidably engage the opposing faces of a flanged column 21.

Referring to FIG. 2, four flanged columns 21 are vertically disposed at each corner of the foundation support platform 11 and are securely anchored in footings below the underlying grade elevation 22. As described above, each of the cuboidal column guides 12 slidably encompasses a section of one of the columns 21, such that the foundation support platform 11 can ride up and down along the columns 21. The range of such motion is limited by column caps 23 at the top of the columns 21 and frame stop blocks 24 laterally extending from the columns 21 at a pre-determined lowered platform elevation 25.

Figure 3:
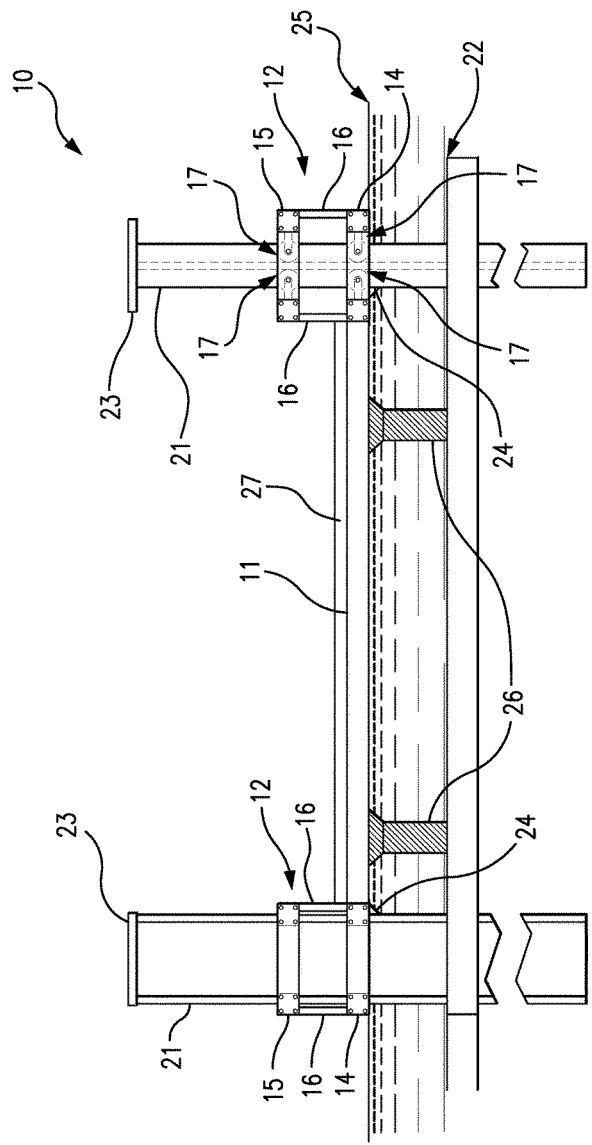
FIG. 3 is a side profile view of a house section supported on a jackable house foundation support according to the preferred embodiment of the present invention.

Referring to FIG. 3, the jackable building foundation 10 is depicted in the lowered condition, with the foundation support platform 11 resting on the frame stop blocks 24 above multiple platform jacks 26 attached to the bottom of the foundation support platform 11 with a clearance above the underlying grade 22. The platform jacks 26 can be hydraulic scissor jacks, such as that disclosed in U.S. Pat. No. 4,175,644, which is incorporated herein by reference. The platform jacks can alternatively be electrically driven machine screw actuators, such as one of the Enerpac® M-Series. The sizes and positions of the platform jacks 26 are based on the weight distribution of the building to be lifted.

The total lifting force of the platform jacks 26 should exceed the weight of the building and the foundation support platform 11 sufficiently to lift the foundation support platform to a designated raised platform elevation above the maximum expected flood elevation. The overall resultant lifting force of the platform jacks 26 should align with the overall center of gravity of the building and foundation support platform 11, in order to avoid the generation of torques, which would otherwise cause the foundation support platform 11 to rise unevenly and tend to cause jamming of the roller frames 13 on the columns 21.

Since lateral forces associated with storm surge or rising water may also subject the foundation support platform 11 to torques, the preferred embodiment of the present invention 10 minimizes the risk of torque-induced jamming of the roller frames 13 in two ways. First, the roller frames 13 are incorporated into the cuboidal column guides 12, in which the rigid vertical members 16 resist any torque that would tend to rotate the roller frames 13 out of the horizontal plane and thereby deform the cuboidal structure of the column guides 12. Second, as best seen in FIG. 1, the orientation of the columns 21 alternates orthogonally at each corner of the foundation support platform 11, so that the roller frame 13 of one corner is always immobile with respect to torques which would cause the roller frame 13 of the opposite corner to slide. For example, referring to FIG. 1, a clockwise transverse torque (tending to rotate the platform 11 from side AD toward side BC) would encounter immobility in corners A and C, where the columns 21 are orthogonal to their counterparts in corners B and D. Conversely, a clockwise longitudinal torque (tending to rotate the platform 11 from side AB toward side CD) would encounter immobility in corners B and D.

Figure 4:
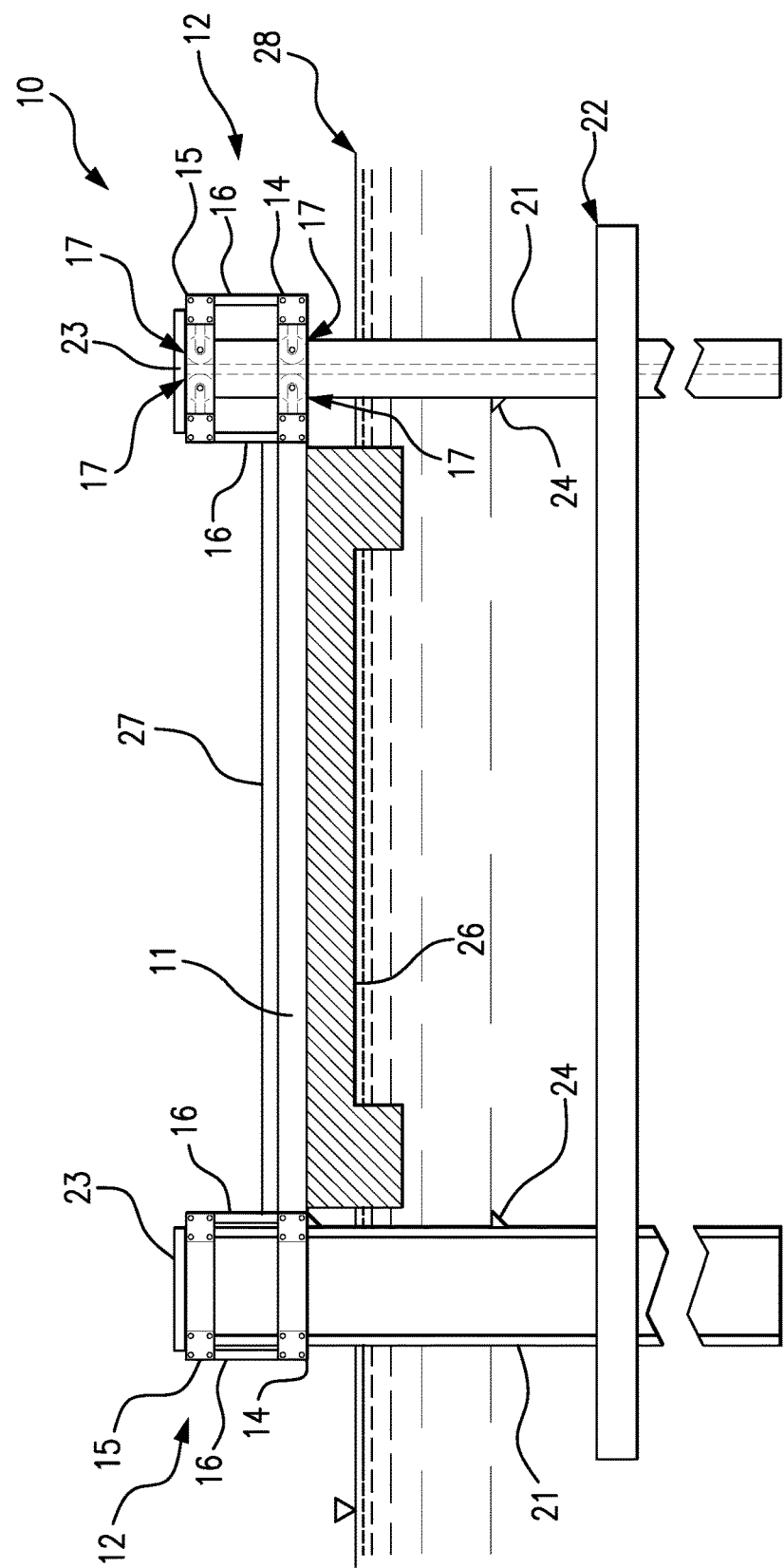
FIG. 4 is a side profile view of a house section lifted on a jackable house foundation support according to the preferred embodiment of the present invention.

Referring to FIGS. 3 and 4, the floor joist 27 of the building is supported on the foundation support platform 11. In the raised condition, depicted in FIG. 4, the lifting force of the platform jacks 26 supports the platform 11 at the raised platform elevation 29 above the elevation of the flood waters 28, thereby preventing flood damage to the building. When the flood waters recede, the platform jacks 26 are retracted and the cuboidal column guides 12 allow the platform 11 to slide back down to its lowered elevation 25.

Figure 6:
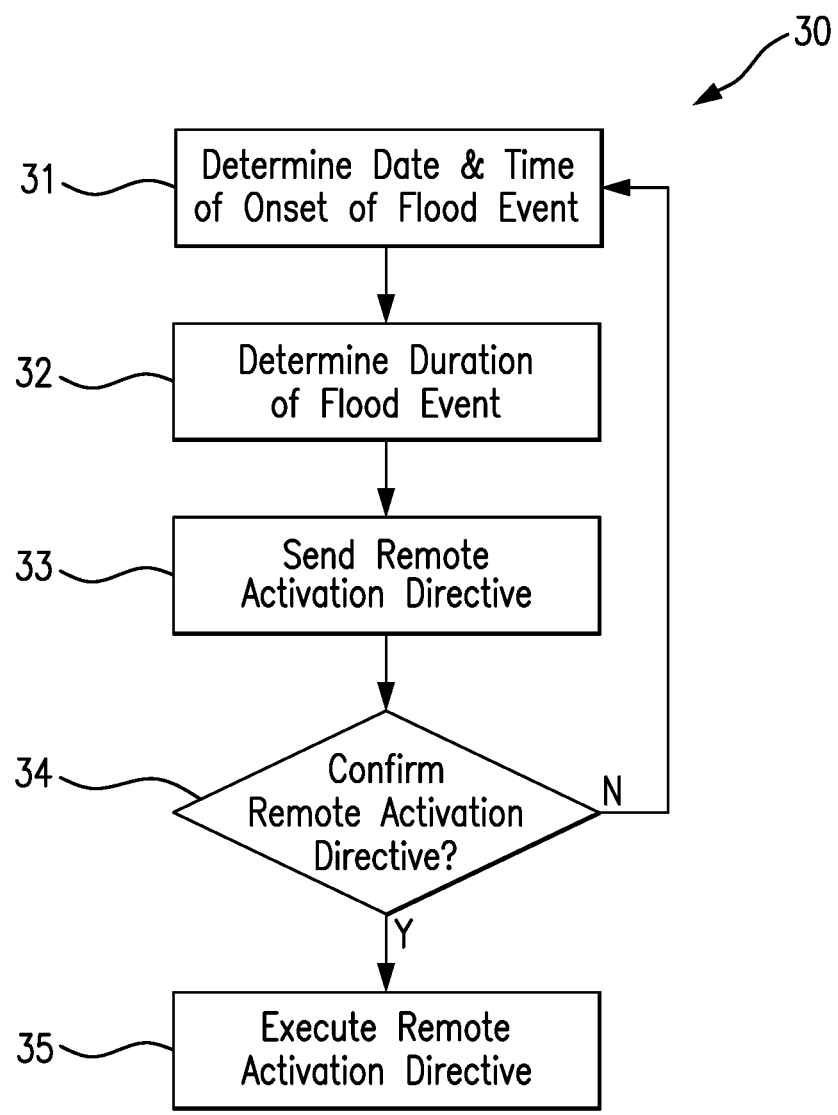
FIG. 6 is a flow chart for an exemplary remote control component of the jackable building foundation system.

Referring to FIG. 6, an exemplary remote control system 30 for the jackable foundation determines, by reference to publically available weather data, the expected date and time of inset of a flood event 31, as well as the expected duration of the flood event 32. A remote activation directive 33 is sent via wireless telephone, wi-fi, rf, Bluetooth and/or infrared signal to a system controller microprocessor or CPU 36 which interfaces with the platform jacks 26. After the system controller microprocessor/CPU 36 confirms the remote activation directive 34, the platform jacks 26 are activated 35 to lift the platform 11 to the raised platform elevation 29 above the flood elevation 28. At the end of the flood duration, the platform jacks 26 are retracted to return the platform 11 to the lowered platform elevation 25.

Figure 7:
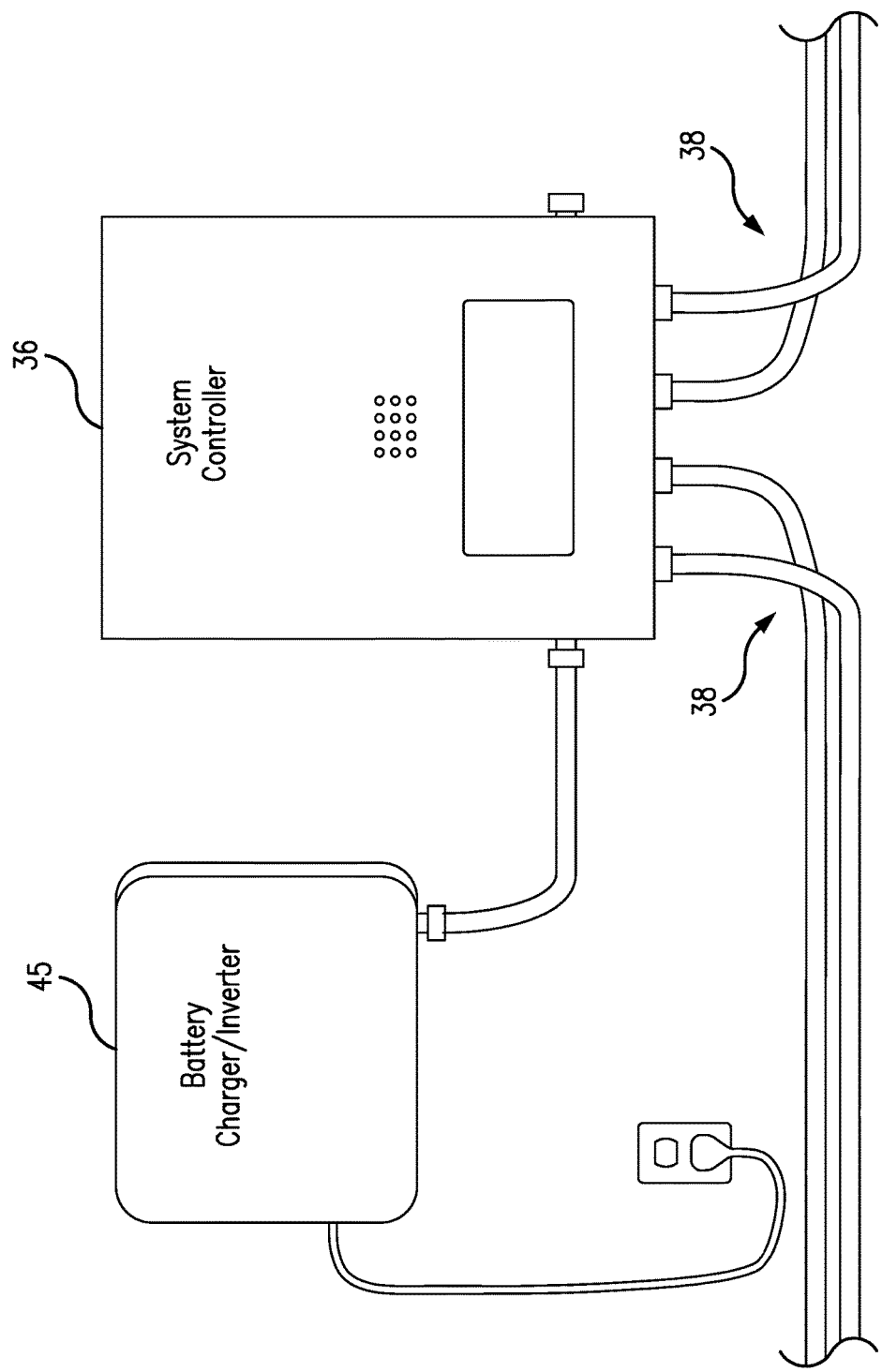
FIG. 7 is a detail perspective view of exemplary system controller components of the present invention.

FIG. 7 depicts an exemplary system controller 36, powered by external AC power through a DC inverter 45, with platform jack connections 38 to each of the four platform jacks 26. Backup power to the controller 36 and jacks 26 can be provided by a high capacity lithium ion battery or a generator (not shown).

Figure 8:
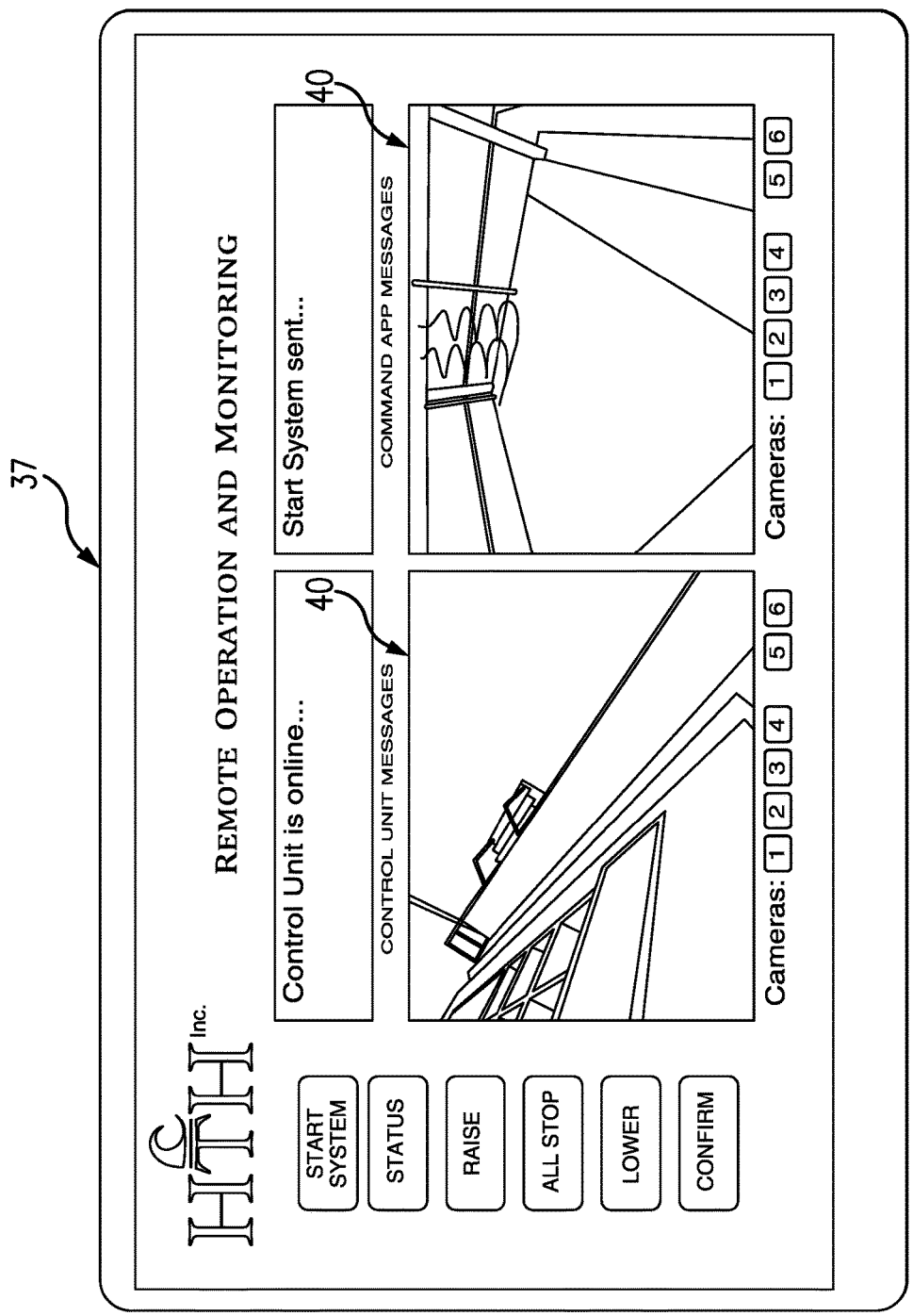
FIG. 8 is an exemplary screen shot of the application software component of the present invention.

As shown in FIG. 8, the system controller 36 communicates, via wireless telephone, wi-fi, rf, Bluetooth or infrared signal, with a user's remote digital device, which in this example is a smartphone 37. The smartphone 37 runs an application software that enables the remote user to issue commands to the system controller 36 to raise and lower the foundation support platform 11, as well as to monitor the raising/lowering progress of the platform 11 and its levelness in real time.

Figure 9:
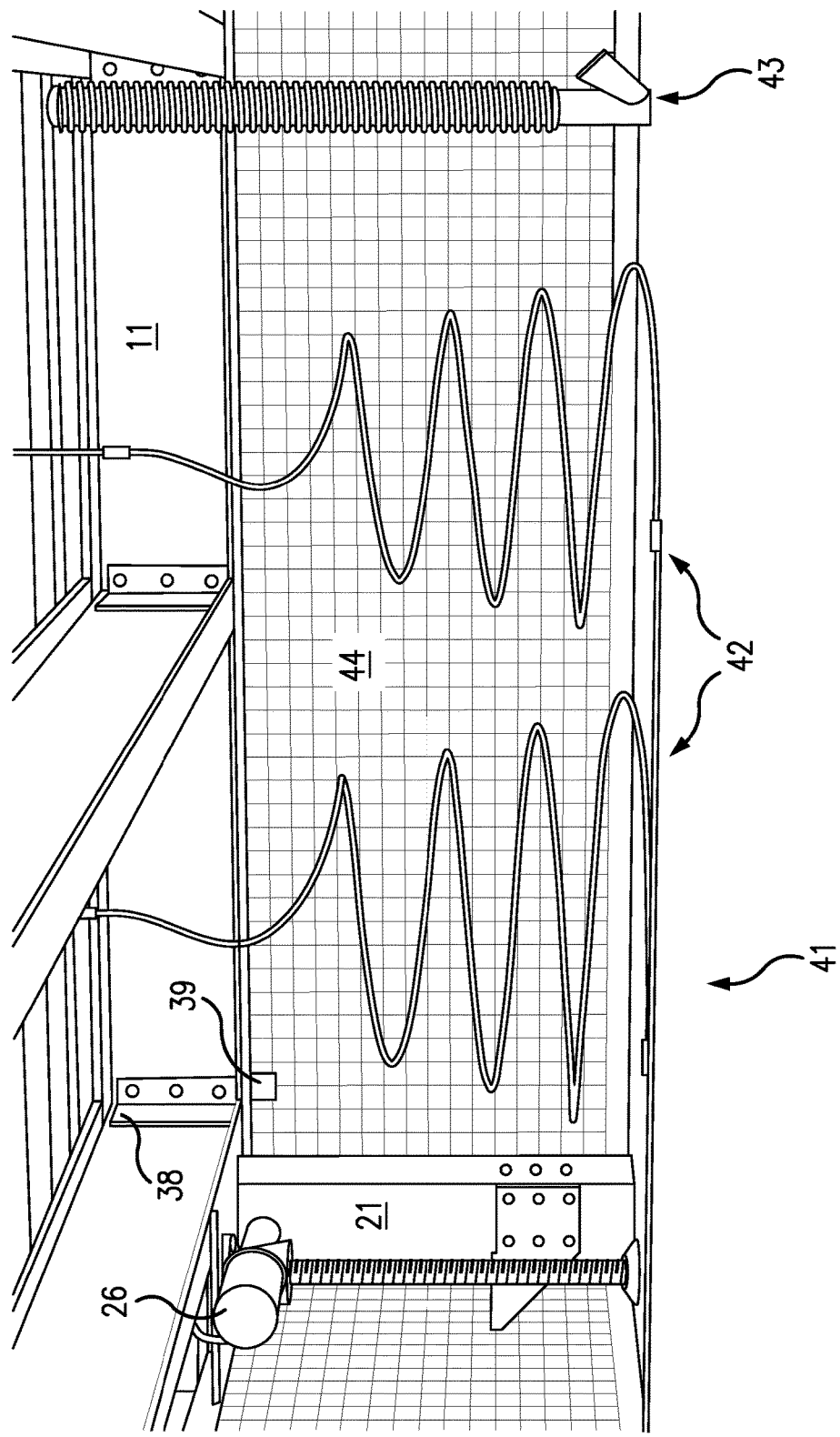
FIG. 9 is a detail perspective view of an exemplary crawlspace area beneath the building support platform of the present invention.

As depicted in FIG. 9, platform elevation and levelness is monitored in real time by multiple platform sensors 38, which transmit their data through the system controller 36 to the smartphone app 37. Multiple video cameras 39, preferably infrared, located beneath the platform 11 and around the building, stream real time video images 40 to the smartphone app 37, as shown in FIG. 8.

FIG. 9 also depicts an exemplary crawlspace 41 beneath the platform 11, through which underground utility connections to the building can be provided. To accommodate the raising of the foundation support platform 11, electric, natural gas and water service lines 42 are looped and coiled so as to be extendable, and an extendable bellow-type sewer line 43 is used. The crawlspace 41 is enclosed by nylon mesh netting 44, which unfolds as the platform 11 rises and blocks flood debris from entering the crawlspace 41.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A jackable foundation system for a building comprising:
a rectangular steel foundation support platform, having four corners, and having a lower surface and an upper surface on which the building rests;
four cuboidal column guides, wherein each cuboidal column guide is attached to one of the corners of the foundation support platform, and wherein each cuboidal column guide comprises two rectangularly interconnected square roller frames, consisting of a first tier roller frame, which is horizontally aligned with the foundation support platform, and a second tier roller frame, which is at a level above a level of the foundation support platform, and wherein each roller frame contains a pair of opposing roller mechanisms, each roller mechanism comprising a cylindrical roller, which is horizontally rotatably supported through an axial bore by a roller rod attached to the respective roller frame;
four vertical flanged columns, located at the four corners of the foundation support platform, each column having an upper and a lower terminus, with the lower terminus secured below an underlying grade elevation, and each column having two opposing faces disposed between two end flanges, wherein the paired roller mechanisms of each roller frame slidably engage the two opposing faces of one of the columns, such that the foundation support platform has a slidable range of movement upward and downward along the columns, and wherein the upward range of movement is constrained by four column caps located at the upper terminus of each column, and wherein the downward range of movement is constrained by four frame stop blocks laterally extending from each column at a non-raised platform elevation;
one or more platform jacks attached to the foundation support platform, or attached to one or more of the cuboidal column guides, or attached to both the foundation support platform and to one or more of the cuboidal column guides, such that the one or more platform jacks, when activated, cause the foundation support platform to slide upward along the columns to a raised platform elevation or downward along the columns to a lowered platform elevation, and such that the platform jacks lift and support the building and the foundation support platform at the raised platform elevation and lower the building and the foundation support platform into the lowered platform elevation; and
wherein the first tier roller frame and the second tier roller frame of each cuboidal column guide are rigidly interconnected at four corners by vertical members, so as to form the cuboidal column guides as open cuboidal structures, and such that the vertical members resist any torque that tends to rotate the roller frames out of the horizontal plane or that tends to deform the cuboidal structures of the cuboidal column guides, thereby reducing the likelihood of jamming of the roller frames on the columns.

2. The jackable foundation system according to claim 1, wherein the platform jacks are designed to exert an overall lifting force that is vertically aligned with an overall center of gravity of the building and foundation support platform, so as to avoid generation of torques, which would otherwise tend to cause the foundation support platform to slide upward unevenly and tend to cause jamming of the roller frames on the columns.

3. The jackable foundation system according to claim 1, wherein the columns have orientations that alternate orthogonally at each corner of the foundation support platform, so that the roller frames of one corner are immobile with respect to a torque which would cause the roller frames of an opposite corner to slide, thereby reducing the likelihood of jamming of the roller frames on the columns.

4. The jackable foundation system according to claim 2, wherein the columns have orientations that alternate orthogonally at each corner of the foundation support platform, so that the roller frames of one corner are immobile with respect to a torque which would cause the roller frames of an opposite corner to slide, thereby reducing the likelihood of jamming of the roller frames on the columns.

5. The jackable foundation system according to claim 3, further comprising a processing means, wherein the processing means receives and implements remote instructions to activate the platform jacks, and thereby lift and support the building and the foundation support platform at the raised platform elevation, in advance of a forecasted flooding event, and to retract the platform jacks, and thereby lower the building and the foundation support platform to the lowered platform elevation after the flooding event.

6. The jackable foundation system according to claim 4, further comprising a processing means, wherein the processing means receives and implements remote instructions to activate the platform jacks, and thereby lift and support the building and the foundation support platform at the raised platform elevation, in advance of a forecasted flooding event, and to retract the platform jacks, and thereby lower the building and the foundation support platform to the lowered platform elevation after the flooding event.

7. The jackable foundation system according to claim 5, wherein the remote instructions are sent from a remote digital device running an application software.

8. The jackable foundation system according to claim 6, wherein the remote instructions are sent from a remote digital device running an application software.

9. The jackable foundation system according to claim 7, wherein the application software enables input or retrieval of flood data regarding an expected date and time of onset of the forecasted flooding event and an expected duration of the forecasted flooding event for the purpose of remotely controlling the platform jacks.

10. The jackable foundation system according to claim 7, further comprising multiple platform sensors attached to the foundation support platform, wherein each of the platform sensors detects a sensor elevation above the lowered platform elevation and transmits the sensor elevation to the processing means, and wherein the processing means is configured and programmed to receive each of the sensor elevations from the multiple platform sensors and to continuously calculate from the sensor elevations a series of platform elevation readings and a series of platform levelness readings in real time.

11. The jackable foundation system according to claim 8, wherein the application software enables input or retrieval of flood data regarding an expected date and time of onset of the forecasted flooding event and an expected duration of the forecasted flooding event for the purpose of remotely controlling the platform jacks.

12. The jackable foundation system according to claim 8, further comprising multiple platform sensors attached to the foundation support platform, wherein each of the platform sensors detects a sensor elevation above the lowered platform elevation and transmits the sensor elevation to the processing means, and wherein the processing means is configured and programmed to receive each of the sensor elevations from the multiple platform sensors and to continuously calculate from the sensor elevations a series of platform elevation readings and a series of platform levelness readings in real time.

13. The jackable foundation system according to claim 10, wherein the application software is configured to remotely interface with the processing means and to monitor and display on the remote digital device the series of platform elevation readings and the series of platform levelness readings in real time.

14. The jackable foundation system according to claim 12, wherein the application software is configured to remotely interface with the processing means and to monitor and display on the remote digital device the series of platform elevation readings and the series of platform levelness readings in real time.

15. The jackable foundation system according to claim 13, further comprising a backup power supply to power the platform jacks and the processing means when an external power source is interrupted.

16. The jackable foundation system according to claim 14, further comprising a backup power supply to power the platform jacks and the processing means when an external power source is interrupted.

17. The jackable foundation system according to claim 15, wherein the processing means is configured and programmed to continuously detect in real time an external power source status and a backup power supply capacity, and wherein the application software is configured to remotely interface with the processing means and to monitor and display on the remote digital device the external power source status and the backup power supply capacity in real time.

18. The jackable foundation system according to claim 16, wherein the processing means is configured and programmed to continuously detect in real time an external power source status and a backup power supply capacity, and wherein the application software is configured to remotely interface with the processing means and to monitor and display on the remote digital device the external power source status and the backup power supply capacity in real time.

19. The jackable foundation system according to claim 17, further comprising multiple video cameras, some or all of which are infrared video cameras, wherein the video cameras are directed toward one or more monitored areas beneath the foundation support platform and around the building, and wherein the video cameras are adapted to wirelessly transmit streaming video images of the monitored areas, and wherein the application software is configured to receive the streaming video images from the video cameras and selectively display the streaming video images on the remote digital device in real time.

20. The jackable foundation system according to claim 18, further comprising multiple video cameras, some or all of which are infrared video cameras, wherein the video cameras are directed toward one or more monitored areas beneath the foundation support platform and around the building, and wherein the video cameras are adapted to wirelessly transmit streaming video images of the monitored areas, and wherein the application software is configured to receive the streaming video images from the video cameras and selectively display the streaming video images on the remote digital device in real time.

21. The jackable foundation system according to claim 19, further comprising one or more extendable utility connections, wherein each extendable utility connection comprises a utility service line which stretches, uncoils or expands to maintain a connection to the building as the building is raised, and which retracts, recoils or contracts as the building is lowered.

22. The jackable foundation system according to claim 20, further comprising one or more extendable utility connections, wherein each extendable utility connection comprises a utility service line which stretches, uncoils or expands to maintain a connection to the building as the building is raised, and which retracts, recoils or contracts as the building is lowered.

23. The jackable foundation system according to claim 21, further comprising a foldable mesh netting sheet suspended from the bottom of the foundation support platform, wherein the mesh netting sheet unfolds as the foundation support platform rises, thereby forming a perimeter screen around the area beneath the foundation support platform so as to impede ingress of floating debris.

24. The jackable foundation system according to claim 22, further comprising a foldable mesh netting sheet suspended from the bottom of the foundation support platform, wherein the mesh netting sheet unfolds as the foundation support platform rises, thereby forming a perimeter screen around the area beneath the foundation support platform so as to impede ingress of floating debris.

* * * * *